Aug. 11, 1925.

G. D. SUNDSTRAND 1,549,278

LATHE AND METHOD OF MACHINING STOCK

Original Filed Dec. 13, 1919  4 Sheets-Sheet 1

Inventor
Gustaf D. Sundstrand
By Miller, Chindahl & Parker
Attys

Aug. 11, 1925.

G. D. SUNDSTRAND 1,549,278

LATHE AND METHOD OF MACHINING STOCK

Original Filed Dec. 13, 1919   4 Sheets-Sheet 2

Inventor
Gustaf D. Sundstrand
By Miller Chindahl & Parker
Attys.

Aug. 11, 1925. 1,549,278
G. D. SUNDSTRAND
LATHE AND METHOD OF MACHINING STOCK
Original Filed Dec. 13, 1919 4 Sheets-Sheet 3

Inventor
Gustaf D. Sunstrand
By Miller, Chindahl & Parker,
Attys

Aug. 11, 1925.
G. D. SUNDSTRAND
1,549,278
LATHE AND METHOD OF MACHINING STOCK
Original Filed Dec. 13, 1919    4 Sheets-Sheet 4
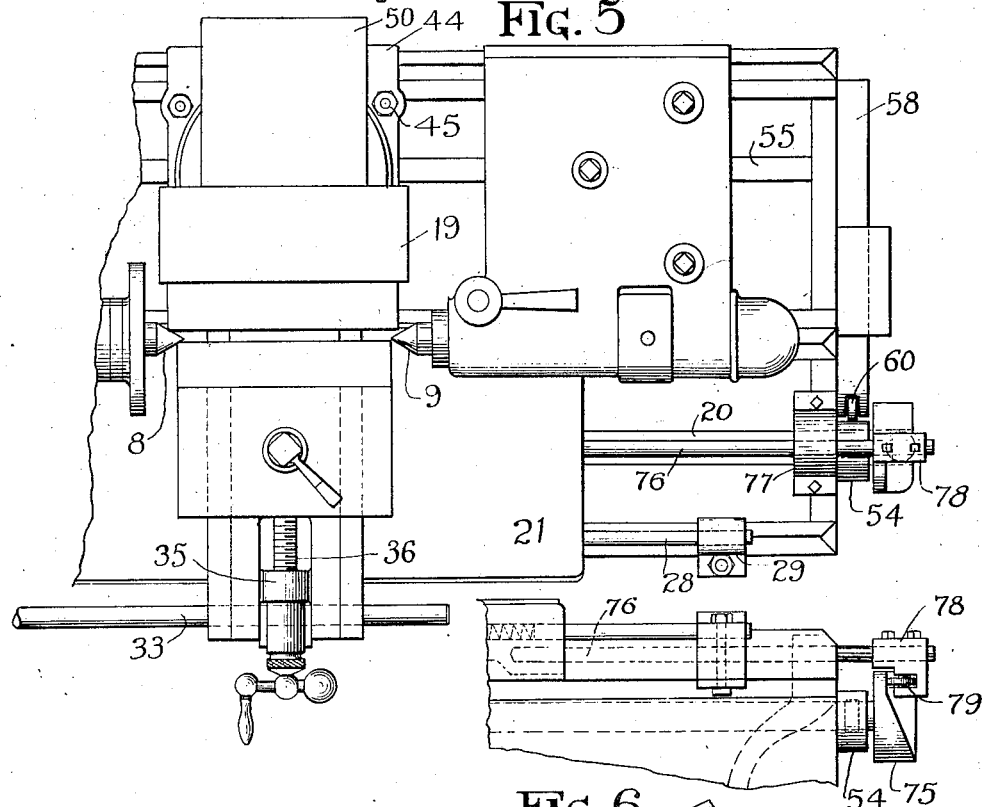
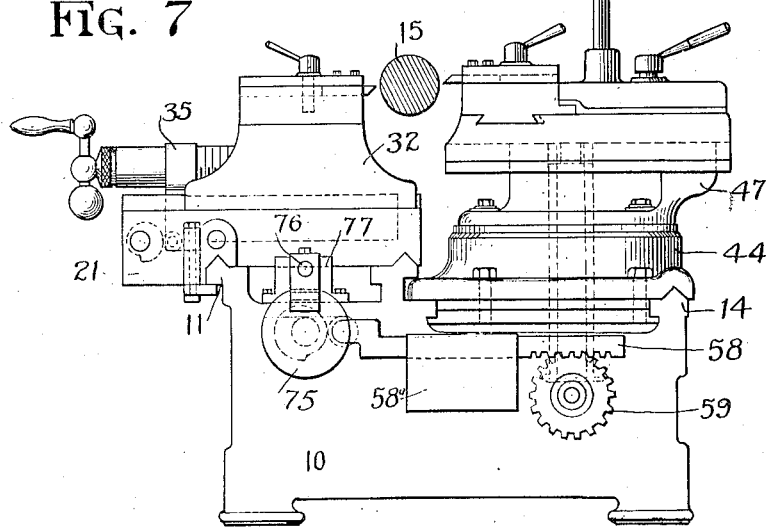
Inventor
Gustaf D. Sundstrand
By Miller Chindahl & Parker,
Attys Patented Aug. 11, 1925.

1,549,278

UNITED STATES PATENT OFFICE.

GUSTAF DAVID SUNDSTRAND, OF ROCKFORD, ILLINOIS, ASSIGNOR TO ROCKFORD TOOL COMPANY, OF ROCKFORD, ILLINOIS, A CORPORATION OF ILLINOIS.

LATHE AND METHOD OF MACHINING STOCK.

Application filed December 13, 1919, Serial No. 344,579. Renewed October 27, 1922. Serial No. 597,427.

*To all whom it may concern:*

Be it known that I, GUSTAF DAVID SUNDSTRAND, a citizen of the United States, residing at Rockford, in the county of Winnebago and State of Illinois, have invented certain new and useful Improvements in Lathes and Methods of Machining Stock, of which the following is a specification.

My invention relates to lathes and more especially to semi-automatic lathes designed to automatically perform part or all of the mechanical operations necessary to turn out a finished piece of work.

In the present embodiment of my invention, the entire machining process is automatic it being only necessary for the workman to put the work in place between the spindles and start the machine.

One object of my invention is to provide a lathe of the class above referred to having a rear tool as well as a front tool carriage, and to combine the motion of the front tool with that of the rear tool in a more efficient manner than heretofore.

Another object of my invention is to provide for complete automatic actuation of both the front and rear tools.

Further objects and advantages will be apparent as the description proceeds.

Figure 1:
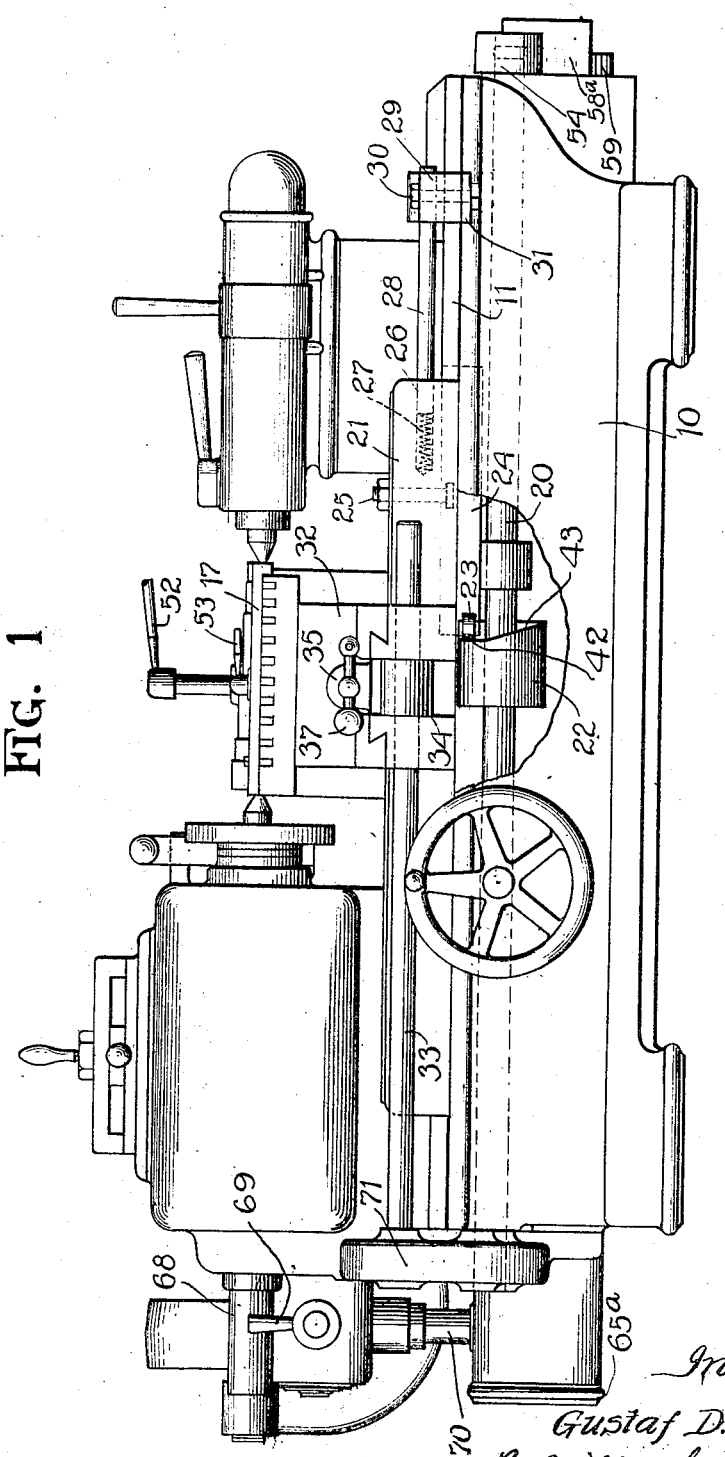
Figure 2:
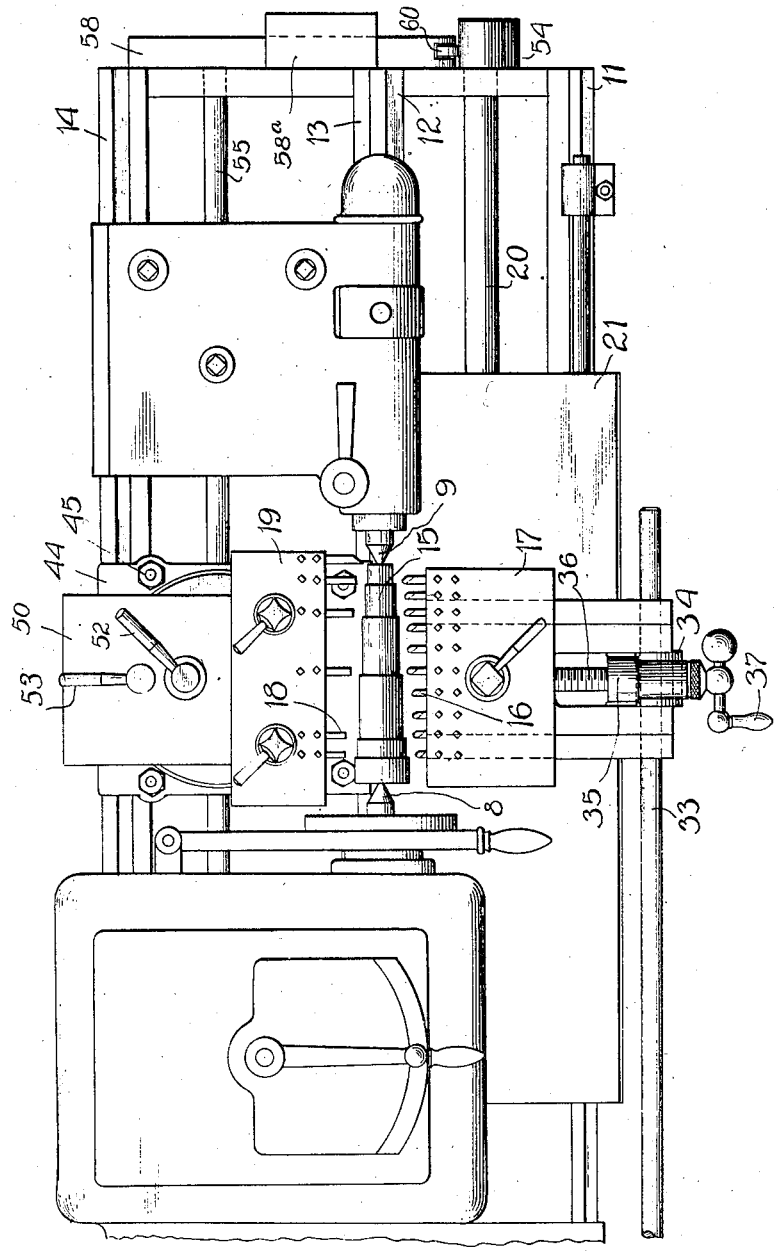
Figure 3:
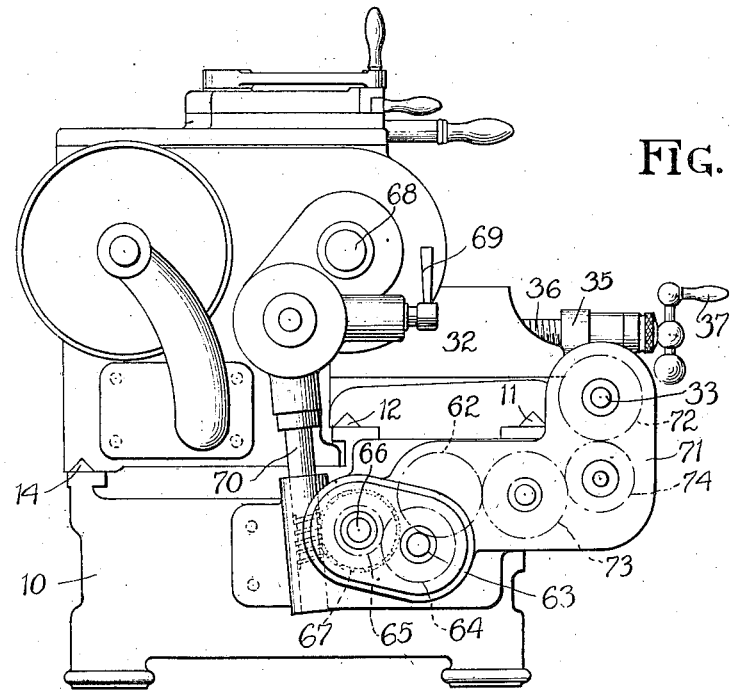
Figure 4:
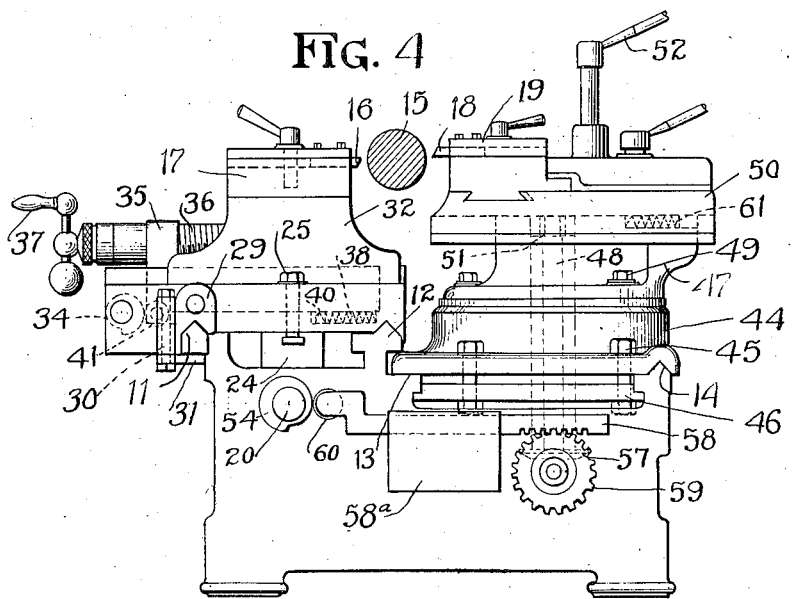

In the accompanying drawings, Figure 1 is a side view and Fig. 2 a plan view of a lathe according to my invention. Fig. 3 is an end view from the head-stock end and Fig. 4 is an end view from the tail-stock end, the tail-stock being removed to show the front and rear tools. Fig. 5 is a plan view showing an alternative arrangement of the automatic cam means I have selected for operating my device. Fig. 6 is a fragmentary front elevation of a portion of the parts illustrated in Fig. 5, and Fig. 7 is an end view similar to Fig. 4 illustrating the modified construction.

The device disclosed and in which the principles of my invention have been embodied, comprises a lathe bed having a front tool and a rear tool, means for supporting and rotating the work and automatic means for actuating said front and rear tools.

Referring to the drawings; I have shown a bed 10 having front ways 11 and 12, and rear ways 13 and 14. The rearmost front way 12 and the frontmost rear way 13 as clearly indicated in Fig. 4 are located one above the other approximately in the vertical plane of the center line of the lathe. The advantages of this construction are fully set forth in my U. S. Patent No. 1,325,424, December 16, 1919, and need not be further described. It should be understood that my invention is not limited to a lathe having this type of bed but may be applied to any type of lathe.

I have illustrated a piece of work 15 mounted between the lathe centers 8 and 9, the work being of a type which can be handled to especial advantage in a machine of this sort. As illustrated, the piece of work 15 is cylindrical and comprises a plurality of cylindrical portions of successively decreasing diameters. In machining work of this character it has heretofore been necessary to machine each cylindrical surface and subsequently to square the radial faces forming the shoulders. According to my invention all the cylindrical surfaces are simultaneously machined by a set or gang of tools 16 mounted in a holder 17, and the shoulders are also all squared simultaneously by a similar set of tools 18 carried by the rear tool holder 19.

In performing these operations automatically, the front tool holder 17 is first moved in toward the center line from the position shown in Fig. 2 to a point where longitudinal motion will machine the various cylindrical portions to the desired diameters. It is then automatically held at this radial distance and fed longitudinally to the right, away from the partly finished shoulders to generate the cylindrical portions. As soon as the front tools have started moving to the right, the rear tools 18 are fed in and finish the shoulders simultaneously with the finishing of the cylindrical portions by the front tool. When the operation is completed both the front and rear tools are automatically returned to their initial positions and all the workman need do is to stop the spindle, replace the finished piece of work with an unfinished piece of stock, and start the spindle again.

The means I have provided for automatically actuating the front tool comprises a longitudinal shaft 20 located centrally under the front tool carriage 21 and carrying a cylindrical cam 22, against the longitudinally acting end face of which a cam roller 23 engages. The cam roller 23 is rotatably journaled in the end of a roller carrying block 24 longitudinally adjustable along the under surface of the front tool carriage 21 and adapted to be clamped in longitudinally adjusted position by a suitable clamping bolt 25. A longitudinal socket 26 in the end of the front tool carriage 21 contains a compression spring 27, and a push pin 28 carried by an adjustable block 29 adapted to be clamped in any desired position on the front way 11 by a suitable clamping bolt 30, and plate 31, enters the socket 26 and forms an abutment for the spring.

Transverse motion is transmitted to the front tool holder 17 through another longitudinally extending shaft 33. This shaft is journaled for sliding rotation in suitable bearings in the front portion of the front tool carriage 21 and carries a radially acting cam 34. The cross slide 32 is transversely slidable on the carriage 21 which also supports a transversely slidable block 35. The block 35 and the cross slide 32 are adjustably held in spaced relation by the usual feed screw 36 having a suitable handle 37. The block 35 is resiliently urged away from the center line of the machine by any suitable means, such as a compression spring 38 seated in a socket in the front carriage and acting on a lug 40 on the block 35. A suitable roller 41 at the front end of the block 35 engages the cam 34 above referred to, which has a spiral portion of gradually increasing diameter and a cylindrical portion ending in a radial step which extends inwardly to the beginning of the spiral portion.

To generate the front tool motion desired for the particular piece of work shown, I have illustrated the cam 22 as having a plane portion 42 followed by a helically cut portion 43. The two cams 22 and 34 are geared together for simultaneous rotation at the same speed. It will be apparent that when they are properly adjusted, the spiral portion of the cam 34 will feed the front tool in while the plane portion of the cam 22 allows the front tool carriage to remain at rest. Subsequently the cylindrical portion of the cam 34 will hold the front tool holder at a proper radial distance while the helical portion of the cam 22 forces the front carriage longitudinally to machine the cylindrical portions of the work.

The rear tool I have illustrated is of the type described and illustrated in my copending application, Serial No. 336,705 filed November 8, 1919 and need not be herein described in detail. Briefly it comprises a base 44 clamped in adjusted position by suitable bolts 45 and a clamping plate 46, and surmounted by a pivoted carriage 47 adapted to rotate on the vertical axis of the upwardly extending transmission shaft 48 and to be clamped in any desired position by suitable clamping bolts 49. A slide 50 having a suitable rack engaging a pinion 51 at the upper end of the transmission shaft 48 may be fed in a straight line across the carriage 47, the direction of this feed being controlled by the previous rotary adjustment of the carriage itself. In Fig. 2 I have illustrated carriage 47 as set to feed at right angles to the axis of the work but it will be obvious that if conical shoulders were desired, it could be set to feed at an angle and generate them. The slide 50 carries the tool holder 19 slidable with respect to the slide in a direction at right angles to the motion thereof being actuated in such motion manually by a suitable rack and a pinion rotated by means of the handle 52 and being clamped in position by the handle 53 in the customary manner fully described in my copending application, Serial No. 336,705 above referred to.

The means I have provided for simultaneously actuating the rear tool in proper timed relation to the motion of the front tool comprise, in this instance, a radially acting cam 54 rotating simultaneously with the cams 22 and 34 at the same speed and in the present embodiment carried by and mounted upon the end of the longitudinal shaft 20. A rear drive shaft 55 extends longitudinally under the rear carriage passing through a bevel gear splined upon it, said bevel gear being supported in a bracket depending from the rear base 44 and meshing with a bevel gear 57 to actuate the shaft 48. The rear drive shaft 55 may be actuated by a transversely slidable rack 58 supported in a bearing 58ª meshing with a suitable gear 59 carried by the shaft 55 and having a roller 60 engaging the radially acting cam 54. Any suitable means for maintaining the roller 60 in contact with the cam 54 and for returning the rear tools 18 to their initial position at the end of a cycle of operations may be provided as, for instance, the compression spring 61 suitably socketed in the carriage 47.

I have illustrated a suitable transmission for simultaneously actuating the shafts 20 and 33 to control the automatic operation of the front and rear tools. Referring to Fig. 3 the shaft 20 carries a gear 62 that receives motion from a small pinion 63 rotating simultaneously with a gear 64 which in turn meshes with a gear 65 journaled on the shaft 66 for simultaneous rotation with a worm wheel 67. A readily detachable or hinged cover 65ª may be provided for enclosing the gears 63, 64 and 65 and the worm wheel 67, upon removal or opening of which, gears 64 and 65 may be interchanged or removed and replaced to provide any desired ratio for the transmission. Power is transmitted from the live spindle 68 through suitable transmission gears and a clutch controlled by the hand lever 69 to the worm shaft 70 to actuate the worm wheel 67. The shaft 33 is journaled at the head stock end in a casing 71 and carries a suitable gear 72 having the same number of teeth as the gear 62 on the shaft 20 and driven therefrom through a pair of suitable intermediate gears 73 and 74.

In Figs. 5, 6 and 7, I have illustrated a cam 75 performing the same function as the cam 22 of Fig. 1, but located on the shaft 20 adjacent the cam 54 where it may conveniently be replaced. A suitable connection between the cam 75 and the carriage 21 has been illustrated comprising a rod 76 attached to one end of the carriage 21 and having a slidable mounting in a bearing block 77 carried by the end of the bed 10. The transmission head 78 is adjustably clamped on the rod 76 at the tail stock end of the lathe and carries a suitable roller 79 adapted to engage the cam 75. It will be apparent that the cam 75 is adapted to perform the same functions as the cam 22 and that the transmission from it to the carriage 21 may be readily dismounted to permit actuation of the carriage by other means, such, for instance, as the customary screw thread arrangement for normal actuation of the carriage. It will also be apparent that the cam 75 may be readily replaced by cams of various shapes and sizes to automatically perform the various operations required.

While I have illustrated and described in detail two specific embodiments of my invention, it should be clearly understood that the description is only for purposes of illustration and that many variations and modifications will naturally occur to those skilled in the art. I aim in the subjoined claims to cover all such legitimate variations and modifications.

I claim as my invention:

1. The method of machining a piece of work having a pair of cylindrical portions of different diameters and an annular shoulder separating such portions, which consists in feeding a tool radially into the rotating work to produce a radial cut of a desired depth at the shoulder, subsequently feeding said tool longitudinally away from said shoulder to turn the cylindrical portion of smallest diameter while continuing to hold the tool inwardly, and feeding a second tool radially into engagement with said work to face said shoulder during said turning operation.

2. The method of machining a piece of material having a plurality of cylindrical portions of successively decreasing diameters and shoulders at the ends of said portions, comprising first; the step of feeding a plurality of front tools radially into said work to a desired point, second; the step of subsequently feeding said front tools longitudinally away from said shoulders, and third; the step of feeding a plurality of rear tools radially into said work to machine said shoulders at any time during the cycle of operation.

3. A lathe for machining a piece of work having a pair of cylindrical portions of different diameters and a shoulder separating such portions, comprising, in combination, a front tool support and a rear tool support, a tool carried by each of said supports, the front tool support being movable transversely and also longitudinally relative to the work and the rear tool support being movable transversely relative to the work, and synchronously operating automatic means for effecting, first, a feeding of the tool on the front tool support transversely into engagement with the work at said shoulder to a predetermined depth, second, the longitudinal movement of the tool on the front support away from the shoulder while it continues to be held inwardly, and, third, the transverse movement of the tool on the rear support into engagement with the work to face said shoulder at any time following the first cutting operation.

4. A lathe having, in combination, a front tool carriage, a rear tool carriage, a longitudinally extending drive shaft carrying a cam operatively connected to said front tool carriage to move said carriage longitudinally, another cam carried by said shaft operatively connected to said rear tool carriage, a cross slide on said front tool carriage, and a third cam operatively connected with said drive shaft for actuating said cross slide.

5. A lathe having, in combination, a front tool carriage and a rear tool carriage, a drive shaft, cam means on said drive shaft for actuating said front tool carriage longitudinally, cam means on said drive shaft for actuating said rear tool carriage, a cross slide on said front tool carriage, cam means actuated by said drive shaft for operating said cross slide, a live spindle, and a transmission from said spindle to said drive shaft, said transmission including a clutch, speed reducing means, and speed changing means.

6. A lathe having, in combination, a front tool and a rear tool, cam means for controlling the motion of said rear tool, cam means for controlling the longitudinal motion of said front tool and cam means for controlling the transverse motion of said front tool, a single drive shaft operatively connected with said cam means for simultaneous properly timed actuation thereof, and means for rotating said drive shaft.

7. A lathe having, in combination, a front tool and a rear tool, cam means for controlling the motion of said rear tool, cam means for controlling the longitudinal motion of said front tool and cam means for controlling the transverse motion of said front tool, a single drive shaft operatively connected with said cam means for simultaneous properly timed actuation thereof, a live spindle, and a speed reducing transmission from said spindle to said drive shaft, the speed reduction being largely accomplished in a single step by the use of a worm and worm wheel.

8. A lathe having, in combination, a front tool and a rear tool, cam means for controlling the motion of said rear tool, cam means for controlling the longitudinal motion of said front tool and cam means for controlling the transverse motion of said front tool, a single drive shaft operatively connected with said cam means for simultaneous properly timed actuation thereof, a live spindle, a worm, a clutch adapted to actuate said worm from said live spindle, a worm wheel driven by said worm, and a transmission including change speed gears between said worm and said drive shaft.

In testimony whereof, I have hereunto set my hand.

GUSTAF DAVID SUNDSTRAND.